J. M. MILLINER.
MUZZLE.
APPLICATION FILED MAR. 20, 1911.
1,041,841.
Patented Oct. 22, 1912.
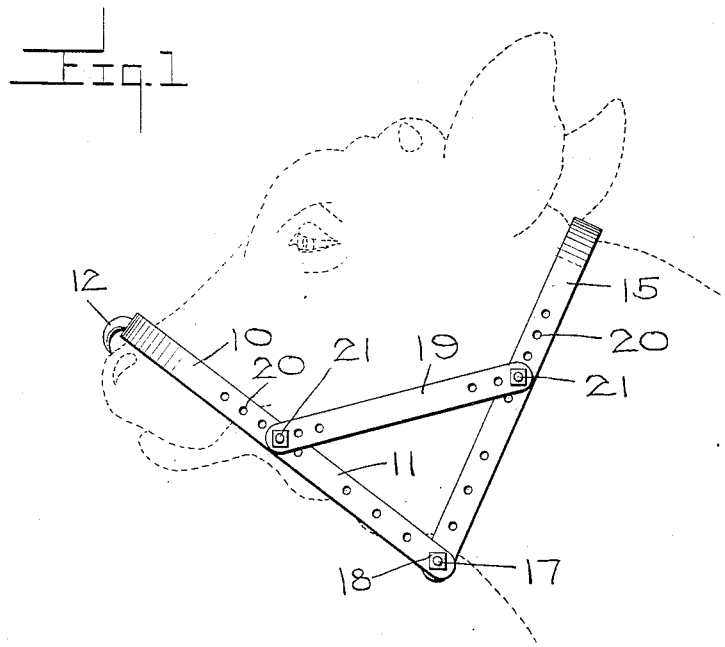
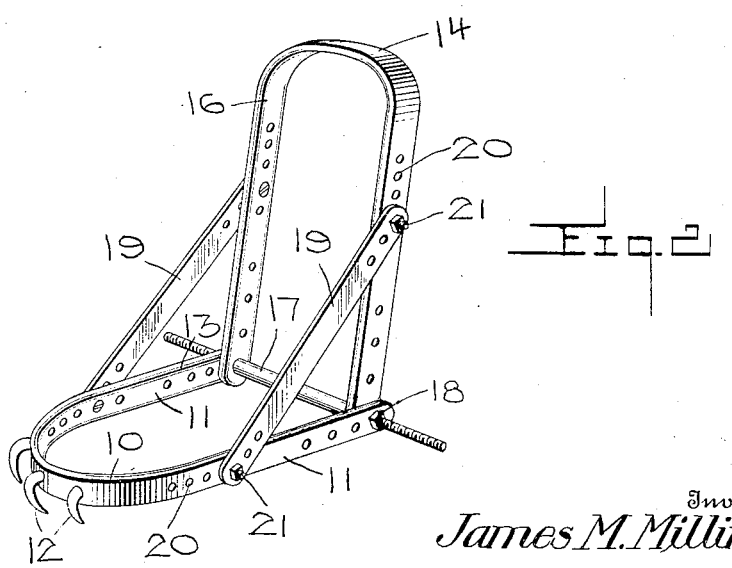
Inventor
James M. Milliner

UNITED STATES PATENT OFFICE.

JAMES M. MILLINER, OF NEW HOPE, ALABAMA.

MUZZLE.

1,041,841.  Specification of Letters Patent.  Patented Oct. 22, 1912.

Application filed March 20, 1911. Serial No. 615,635.

*To all whom it may concern:*

Be it known that I, JAMES M. MILLINER, a citizen of the United States, residing at New Hope, in the county of Madison, State of Alabama, have invented certain new and useful Improvements in Muzzles; and I do hereby declare the following to be a full, clear, and exact description of the invention, such as will enable others skilled in the art to which it appertains to make and use the same.

This invention relates to muzzles and has for its object to provide a muzzle that will prick the animal upon attempting to take articles into its mouth, and will be comfortable to the animal and will at the same time be held against a too tight adjustment to the animal so that constriction is prevented.

In ordinary muzzles employing nose engaging rings and throat engaging rings, one great disadvantage lies in the fact that these rings oftentimes are so tightly adjusted in tightening the muzzle to the animal as to impede the circulation in the animal's throat and head. The present invention to remedy this disadvantage and to attain this end employs open cheek and neck loops which intersect at the animal's throat and are connected thereat by a rigid pin and also by inclined rigid braces, these two elements coöperating to prevent the loops conforming to the contour of the animal's throat.

In the accompanying drawing forming part of this specification, Figure 1 is a side elevation of the muzzle applied. Fig. 2 is a perspective view of the muzzle.

Referring now to the drawing in which like characters of reference designate similar parts in the views shown, 10 designates a cheek loop having rearwardly extending legs 11. This loop is provided on its bridge portion with spurs 12 which penetrate the animal's snout upon the animal attempting to take articles into its mouth. The cheek loop is preferably formed of stiff leather or the like, and the inner face of this loop is rounded as shown at 13 so as to present a surface which will be comfortable to the animal's snout.

The neck loop 14 is provided with downwardly extending legs 15 which intersect the cheek loop legs. This neck loop is formed similar to the cheek loop that is, is formed with a rounded inner face 16 for contact with the animal's neck. A single rigid pin 17 spans the open ends of the cheek and neck loops, and connects the legs of these loops at their intersections. The pin is preferably formed circular in cross section at its intermediate portion, and its terminal portions are reduced and threaded and equipped with retaining nuts 18 these nuts clamping the intersecting ends of the cheek and neck loops into engagement with the enlarged intermediate portion of the pin so that the distance across the open ends of both cheek and neck loops remains constant.

A pair of braces 19 are connected at their opposite ends to the legs of the cheek and neck loops. These braces are preferably formed of metal straps and when in applied position, bridge the elbows formed at the intersections of the cheek and neck loop legs. By virtue of their rigidity these braces coöperate with the pin 17 in maintaining the elbows formed at the intersection of the cheek and neck loops rigid so that these elbows will at no time conform to the animal's throat and impede circulation.

It is desirable to have the meetings of the legs between both cheek and neck loops, and the meetings of the braces with these loops adjustably connect and to attain this, a plurality of openings 20 are formed at these meetings, and through any particular openings of the series, bolts 21 are passed to adjustably secure the parts together so that the muzzle may be applied to various sized animals.

What is claimed, is:—

A muzzle comprising a cheek loop formed of a rigid flat strap, an upstanding neck loop formed of a rigid flat strap, the legs of both loops intersecting, rigid flat straps bridging the elbows formed at the intersections of said legs, pins passed through said straps and said legs and adjustably connecting the parts together, a pin bridging the neck and the cheek loops and terminally passed through the intersections of the legs of said loops, said pin having stop shoulders bearing against said intersections, and nuts threaded on the terminals of said pin and clamping said legs at their intersections to said shoulders.

In testimony whereof, I affix my signature, in presence of two witnesses.

JAMES M. MILLINER.

Witnesses:
 JOHN E. COOPER,
 WILLIAM M. BROWN.

Copies of this patent may be obtained for five cents each, by addressing the "Commissioner of Patents, Washington, D. C."